(12) United States Patent
Bergman et al.

(10) Patent No.: US 8,990,411 B2
(45) Date of Patent: Mar. 24, 2015

(54) DYNAMIC CONNECTION MANAGEMENT ON MOBILE PEER DEVICES

(75) Inventors: Joel Robert Bergman, Kirkland, WA (US); Jyh-Han Lin, Mercer Island, WA (US); Fadi Al Sayed Hassan, Bellevue, WA (US); Pavani Haridasyam, Bothell, WA (US); Ryan Bane, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 676 days.

(21) Appl. No.: 12/765,368

(22) Filed: Apr. 22, 2010

(65) Prior Publication Data

US 2011/0264812 A1   Oct. 27, 2011

(51) Int. Cl.
*G06F 15/16* (2006.01)
*H04W 76/04* (2009.01)
*H04L 12/707* (2013.01)
*H04L 12/703* (2013.01)

(52) U.S. Cl.
CPC .............. *H04W 76/041* (2013.01); *H04L 45/22* (2013.01); *H04L 45/28* (2013.01)
USPC ........................................................ 709/228

(58) Field of Classification Search
CPC .......................... H04L 29/06; H04L 29/08576
USPC ............................................. 709/224, 227, 238
See application file for complete search history.

(56) References Cited

U.S. PATENT DOCUMENTS

| | | | | |
|---|---|---|---|---|
| 5,452,471 A * | 9/1995 | Leopold et al. | ............... | 455/429 |
| 5,933,422 A * | 8/1999 | Kusano et al. | ................. | 370/331 |
| 6,198,920 B1 * | 3/2001 | Doviak et al. | .............. | 455/426.1 |
| 6,477,373 B1 * | 11/2002 | Rappaport et al. | ............ | 455/436 |
| 6,542,934 B1 * | 4/2003 | Bader et al. | .................... | 709/239 |
| 6,982,962 B1 * | 1/2006 | Lunsford et al. | .............. | 370/278 |
| 7,082,301 B2 * | 7/2006 | Jagadeesan et al. | .......... | 455/436 |
| 7,571,346 B2 | 8/2009 | Illowsky et al. | | |
| 7,593,321 B2 * | 9/2009 | Galand et al. | ................. | 370/218 |
| 7,676,599 B2 * | 3/2010 | Cooney et al. | ................ | 709/245 |
| 7,937,493 B2 * | 5/2011 | Colrain et al. | ................ | 709/244 |
| 8,125,929 B2 * | 2/2012 | Xia et al. | ....................... | 370/254 |

(Continued)

FOREIGN PATENT DOCUMENTS

CN          101621820 A     1/2010
EP            1940096 A1    7/2008

(Continued)

OTHER PUBLICATIONS

Menon, Anuradha., "Touch Me to Transfer Data", Retrieved at << http://thefutureofthings.com/news/1290/touch-me-to-transfer-data.html >>, Aug. 21, 2008, pp. 2.

(Continued)

*Primary Examiner* — Backhean Tiv
(74) *Attorney, Agent, or Firm* — Bryan Webster; Kate Drakos; Micky Minhas

(57) ABSTRACT

Dynamically evaluating candidate connections as alternatives to an active connection between a first computing device and a second computing device. The first computing device transitions to one of the candidate connections to replace the active connection based on the evaluation. The evaluation and transition occurs based on time intervals, events, or conditions. Maintaining the candidate connections enables mobile devices, for example, to be resilient to and tolerant of topology changes affecting the active connection.

20 Claims, 4 Drawing Sheets

(56) References Cited

U.S. PATENT DOCUMENTS

| | | | |
|---|---|---|---|
| 2004/0260761 A1 | 12/2004 | Leaute et al. | |
| 2006/0227718 A1* | 10/2006 | Wang et al. | 370/252 |
| 2006/0230111 A1 | 10/2006 | Andersen et al. | |
| 2007/0038761 A1* | 2/2007 | Tebeka | 709/228 |
| 2008/0102845 A1* | 5/2008 | Zhao | 455/450 |
| 2008/0123685 A1* | 5/2008 | Varma et al. | 370/466 |
| 2008/0205271 A1* | 8/2008 | Aissaoui et al. | 370/235 |
| 2008/0250408 A1 | 10/2008 | Tsui et al. | |
| 2009/0019165 A1 | 1/2009 | Li et al. | |
| 2009/0252134 A1 | 10/2009 | Schlicht et al. | |
| 2009/0310545 A1* | 12/2009 | Tateson et al. | 370/329 |
| 2009/0310570 A1 | 12/2009 | Smith | |
| 2010/0027426 A1* | 2/2010 | Nair et al. | 370/238 |
| 2010/0082781 A1* | 4/2010 | Lubeck et al. | 709/221 |
| 2010/0220616 A1* | 9/2010 | Glyakov et al. | 370/252 |
| 2010/0251296 A1* | 9/2010 | Kim et al. | 725/38 |
| 2010/0274848 A1* | 10/2010 | Altmaier et al. | 709/203 |

FOREIGN PATENT DOCUMENTS

| | | | |
|---|---|---|---|
| WO | 2006049276 A1 | 5/2006 | |
| WO | 2008023366 A2 | 2/2008 | |
| WO | 2009111853 A1 | 9/2009 | |

OTHER PUBLICATIONS

Rosenberg, et al., "Traversal Using Relays around NAT (TURN): Relay Extensions to Session", Retrieved at << http://tools.ietf.org/html/draft-ietf-behave-turn-16 >>, Jul. 3, 2009, pp. 82.

Rosenberg, J., "Interactive Connectivity Establishment (ICE): A Protocol for Network", Retrieved at <<http://tools.ietf.org/html/draft-ietf-mmusic-ice-19 >>, Oct. 29, 2007, pp. 120.

Rosenberg, "Interactive Connectivity Establishment: ICE", Retrieved at <<http://tools.ietf.org/agenda/67/slides/mmusic-11.pdf>>, 2006, 44 Pages.

Office Action from The State Intellectual Property Office of The People's Republic of China regarding Patent Application 201110113770.3 dated Jun. 28, 2013, pp. 10.

"First Office Action for Chinese Patent Application No. 201110113770.3", Mailed Date: Jun. 28, 2013, The State Intellectual Property Office of The People's Republic of China, 11 pages.

"Second Office Action for Chinese Patent Application No. 201110113770.3", Mailed Date: Mar. 7, 2014, The State Intellectual Property Office of The People's Republic of China, 7 pages.

"Third Office Action for Chinese Patent Application No. 201110113770.3", Mailed Date: Sep. 12, 2014, The State Intellectual Property Office of The People's Republic of China, 7 pages.

\* cited by examiner

DYNAMIC CONNECTION MANAGEMENT ON MOBILE PEER DEVICES

BACKGROUND

Computing devices establish peer-to-peer connections for messaging, gaming, file exchange, and other applications. Existing wired networking systems enable the connectivity between endpoints via relaying and connectivity establishment techniques. In some of the existing systems, because of differences in network address translation and port availability, various connection paths are probed when establishing a peer-to-peer connection to identify the best connection. The identified connection is used for the duration of the peer-to-peer communication as connection quality in the wired networking systems is typically static.

In wireless networking systems, however, connection quality varies over time. For example, topology changes may occur such as when one or both of the devices changes locations. The existing systems fail to accommodate such topology changes, are expensive, and not scalable.

SUMMARY

Embodiments of the disclosure maintain alternative connections for dynamic transition during communication between a first computing device and a second computing device. A first computing device defines a connection between the first computing device and a second computing device as an active connection. As the first computing device changes location, one or more candidate connections between the first computing device and the second computing device are evaluated as alternatives to the active connection. The first computing device transitions the active connection from the defined connection to one of the candidate connections based on the evaluation. The evaluation occurs during data transmission over the defined connection between the first computing device and the second computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure maintain alternative connections for dynamic transition during communication between a first computing device 102 and a second computing device 104. In some embodiments, aspects of the disclosure provide optimized, reliable mobile-to-mobile connectivity for networks where connection characteristics and capabilities may change dynamically. Embodiments of the disclosure are tolerant of and resilient to changes in network topology.

Figure 1:
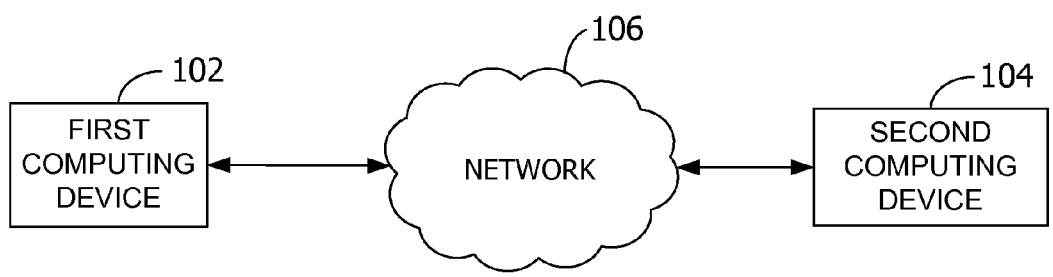
FIG. 1 is an exemplary block diagram illustrating two computing devices communicating with each other via a network.

Referring again to FIG. 1, an exemplary block diagram illustrates two computing devices communicating with each other via a network 106. In the example of FIG. 1, the first computing device 102 communicates with the second computing device 104 via the network 106. In some embodiments, the first computing device 102 and the second computing device 104 are peer devices and the connection between the first computing device 102 and the second computing device 104 is a peer-to-peer connection. For example, the first computing device 102 and the second computing device 104 are mobile devices communicating via a wireless network. In other embodiments, one of the first computing device 102 and the second computing device 104 is a mobile device and the other device provides content, such as a client communicating with a server.

As an example, the first computing device 102 and the second computing device 104 include portable computing devices such as laptops, netbooks, gaming devices, and/or portable media players. However, the first computing device 102 and the second computing device 104 may include any device executing instructions (e.g., application programs). Further, each of the first computing device 102 and the second computing device 104 may represent a group of processing units or other computing devices.

The first computing device 102 and the second computing device 104 communicate via the network 106. Exemplary networks 106 include wired and/or wireless networks, and may represent local area networks or global networks such as the Internet. In embodiments in which the network 106 includes wireless networks, the first computing device 102 and the second computing device 104 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication. In some embodiments, the network 106 includes a wireless cellular network providing Internet access.

Figure 2:
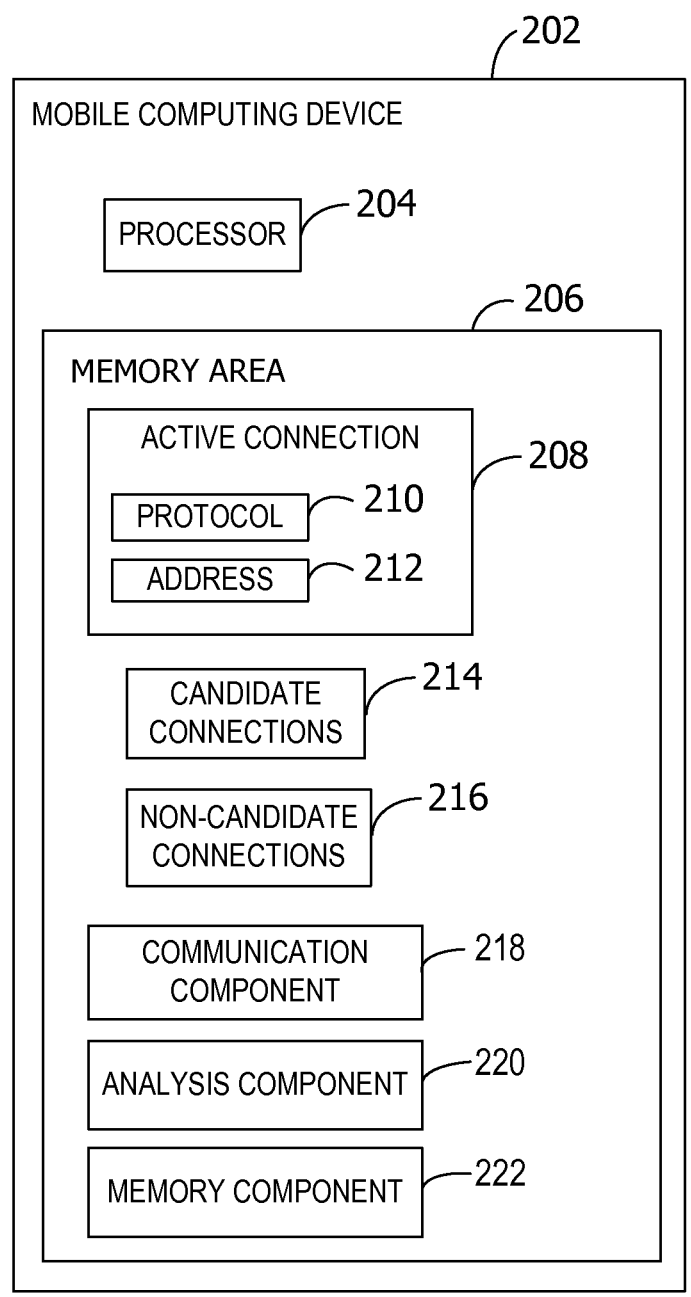
FIG. 2 is an exemplary block diagram illustrating a mobile computing device storing data identifying connections.

Referring next to FIG. 2, an exemplary block diagram illustrates a mobile computing device 202 storing data identifying connections. The mobile computing device 202 maintains alternative connections for dynamic transition during communication with another computing device. With reference to FIG. 1, the mobile computing device 202 represents the first computing device 102, the second computing device 104, or both (separately). For example, the components and data illustrated in FIG. 2 may be executed and stored by the first computing device 102 and/or the second computing device 104.

While illustrated as a single mobile computing device 202 in FIG. 2, aspects of the disclosure contemplate other hardware configurations to provide the functionality associated with the mobile computing device 202. For example, the functionality may be provided by a cloud service, a network of peer-to-peer devices, or other hardware or software configuration.

The mobile computing device 202 has at least one processor 204 and one or more computer-readable media such as a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202 (e.g., by a cloud service). In some embodiments, the processor 204 is programmed to execute instructions such as those illustrated in the figures (e.g., FIG. 3 and FIG. 4).

The memory area 206 includes any quantity of media associated with or accessible to the computing device 202. The memory area 206 may be internal to the computing device 202 (as shown in FIG. 2), external to the computing device 202 (not shown), or both (not shown).

In some embodiments, the memory area 206 stores data defining an active connection 208, a set of candidate connections 214, and a set of non-candidate connections 216. The active connection 208 represents the connection currently in-use for data transmission. The set of candidate connections 214 represents connections which are available, but not currently in use. The set of non-candidate connections 216 represents connections which are currently unavailable due to, for example, connectivity or performance issues.

In some embodiments, the connections may include one or more of the following: local wireless fidelity (Wi-Fi) network with local Internet protocol, public Internet using public Internet protocol assigned by a Wi-Fi router, a BLUETOOTH brand network with a BLUETOOTH brand network address, a 3G network using local Internet protocol, and a 3G network using public Internet protocol assigned by carrier network address translation. The example connections are exchanged, in some embodiments, via a separate presence or control channel. In some embodiments, the first computing device 102 and the second computing device 104 register with a shared service (e.g., a central server or router).

Each of the connections stored by the memory area 206 has a protocol 210 and address 212. Exemplary protocol 210 and address 212 pairs are shown in Table 1 below.

TABLE 1

Exemplary Connections Stored by the First Computing Device.

| Active Connection | Candidate Connection | Candidate Connection | Non-Candidate Connection |
|---|---|---|---|
| Wi-Fi 192.168.1.56:12000 | Wi-Fi 156.78.133.2:23000 | 3G 10.230.3.6:15000 | BLUETOOTH X:Y |

The memory area 206 further stores one or more computer-executable components for implementing aspects of the disclosure. The components may be used to perform the operations illustrated in FIG. 3 and FIG. 4. Exemplary components include a communication component 218, an analysis component 220, and a memory component 222. Execution of these components is next described.

The communication component 218, when executed by the processor 204 causes the processor 204 to define, by the first computing device 102, a connection between the first computing device 102 and the second computing device 104 as the active connection 208. For example, the first computing device 102 identifies available connections (e.g., the candidate connections 214) and selects one of the available connections to establish communication. The analysis component 220, when executed by the processor 204, causes the processor 204 to evaluate one or more of the candidate connections 214 as alternatives to the active connection 208. For example, the analysis component 220 evaluates the candidate connections 214 responsive to an event that may correlate to a change in topology of the active connection 208. For example, the analysis component 220 evaluates the candidate connections 214 at regular intervals as the first computing device 102 changes location. In another example, the analysis component 220 evaluates the candidate connections 214 in response to detection of an event that may alter the topology of the existing connection. The event may include, for example, a change in location of the first computing device 102, arrival of the first computing device 102 at a particular location (e.g., detected via a positioning system such as a global positioning system), or departure of the first computing device 102 from a particular location. Other events include entering or exiting known "dead zones" where signal strength is known to be weak or nonexistent. Other locations may have a high communication cost which the user may have indicated a preference for avoiding to reduce overall communication costs. Aspects of the disclosure, however, are operable with any event or other trigger prompting evaluation by the analysis component 220. The evaluation by the analysis component 220 includes, for example, determining bandwidth, latency, error rate, and other signal or connection characteristics. The evaluation by the analysis component 220 produces, in some embodiments, a ranking or score for the candidate connections 214. For example, the ranking or score may be based at least in part on the determined performance or connection characteristics. Further, the evaluation occurs while the first computing device 102 is actively transmitting and/or receiving data over the active connection 208.

Based on the evaluation by the analysis component 220, the communication component 218 further executes to transition the active connection 208 from the defined connection to one of the candidate connections 214. For example, the analysis component 220 or the communication component 218 selects the candidate connection 214 ranked highest, or meeting other criteria (e.g., specified by the first computing device 102, user, or other entity). The communication component 218 then transitions the selected candidate connection 214 to be the active connection 208. The communication between the first computing device 102 and the second computing device 104 continues over the selected candidate connection 214 (as the new active connection 208).

In some embodiments, the transition by the communication component 218 may occur based on one or more of the following: a failure of a network component supporting the active connection 208, identification of the selected candidate connections 214 having a higher ranking than the active connection 208, and other determinations or input. For example, the first computing device 102 or the second computing device 104 may explicitly request the transition.

The memory component 222, when executed by the processor 204 causes the processor 204 to store the previous active connection 208 (e.g., the defined connection) with the candidate connections 214. In this manner, the previous active connection 208 becomes a possible candidate connection 214 should the performance or connection characteristics of this connection exceed those of the new active connection 208.

At least a portion of the functionality of the various elements in FIG. 2 may be performed by other elements in FIG. 2, or an entity (e.g., processor, web service, server, application program, computing device, etc.) not shown in FIG. 2.

Figure 3:
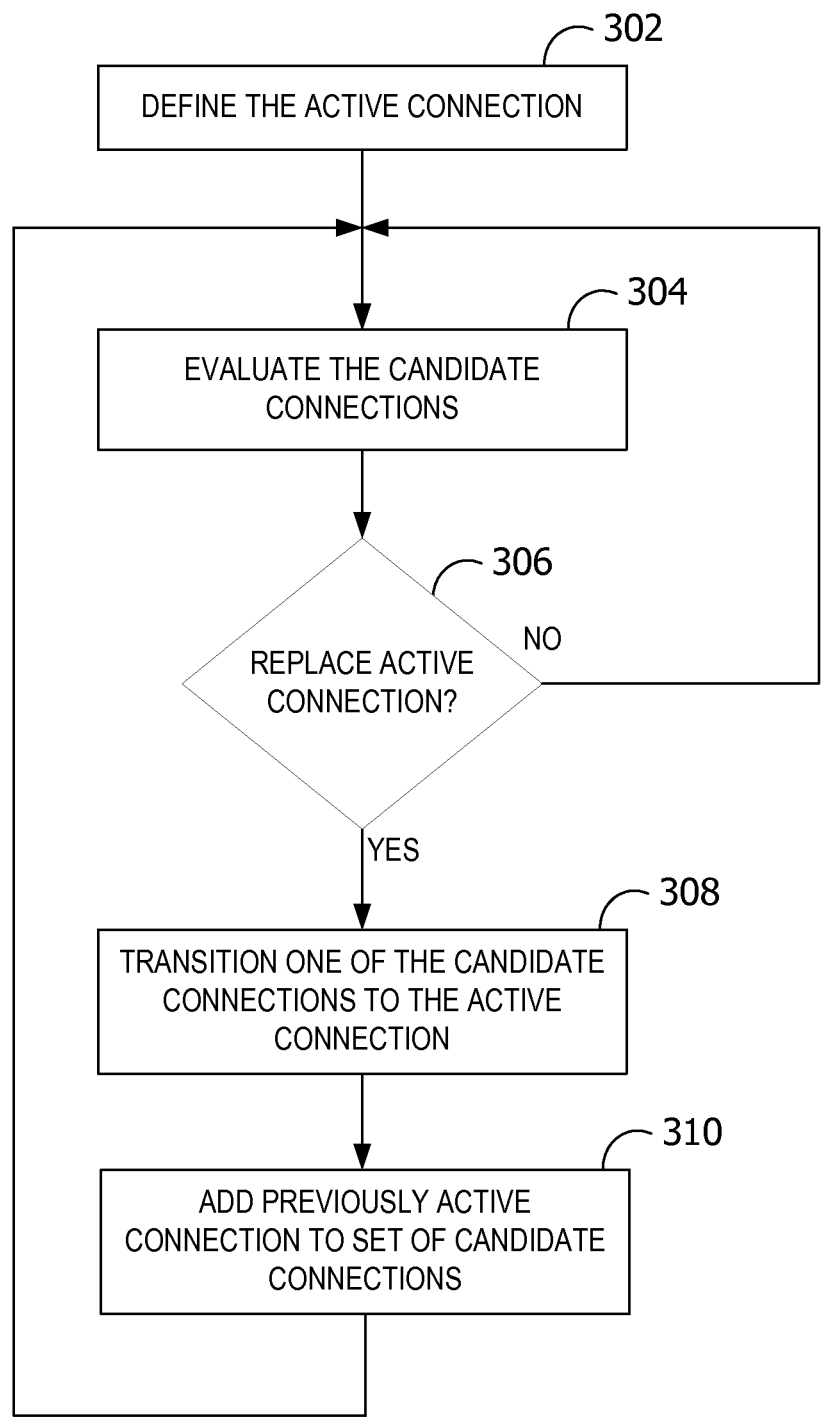
FIG. 3 is an exemplary flow chart illustrating the evaluation of alternative connections and the transition from one connection to another.

Referring next to FIG. 3, an exemplary flow chart illustrates the evaluation of alternative connections and the transition from one connection to another. The active connection 208 between the first computing device 102 and the second computing device 104 is defined at 302. For example, one of the candidate connections 214 may be selected to be the active connection 208. Communication between the first computing device 102 and the second computing device 104 is established using the active connection 208. The communication may established using the protocol 210 and address 212 of the active connection 208, although other means for establishing the communication are contemplated.

At 304, during communication or data transmission between the first computing device 102 and the second computing device 104 via the active connection 208, one or more of the candidate connections 214 are evaluated. For example, each of the candidate connections 214 may be evaluated, or a portion of the set of the candidate connections 214 are evaluated (e.g., only the top ten candidates). The evaluation includes, in some embodiments, determining one or more of the following: bandwidth or throughput, latency, and error rate or packet loss for each of the candidate connections 214. In some embodiments, the active connection 208 is evaluated in parallel (e.g., simultaneously or contemporaneously) with a search for a better connection (e.g., evaluation of the candidate connections 214).

The operation 304 may also be performed at connection initialization time to select the active connection 208 (e.g., operation 302).

Based on the evaluation, aspects of the disclosure produce a ranking of the candidate connections 214. Alternative or in addition, a score is generated for each of the candidate connections 214. Further, a score or other metric is generated for the active connection 208, and is based at least in part on performance of the active connection 208. The ranking or scores are used to determine whether to replace the active connection 208 at 306. For example, each score value is compared to the score value for the active connection 208 to identify one of the candidate connections 214 (e.g., having a higher or greater score than the current active connection 208). The ranking and score may be calculated in some embodiments by assigning weights to various criteria used to measure the performance of the connection.

At 308, the first computing device 102 transitions the identified one of the candidate connections 214 to be the active connection 208. The user of the first computing device 102 is unaware of the transition in some embodiments, such that the transition occurs seamlessly, instantly, and with little perceived transition time to enhance the user experience.

The transition may occur at various times. For example, the transition may occur after the candidate connections 214 are evaluated, at a regular interval (e.g., on the hour, at midnight, etc.). In some embodiments, the transition occurs responsive to detection of a failure of the active connection 208, responsive to reduced performance less than a predefined threshold, or responsive to a topology change associated with the active connection 208.

At 310, the previous active connection 208 is considered to now be one of the candidate connections 214. As such, the previous active connection 208 is "moved" to the set of candidate connections 214 as a fallback connection. During subsequent evaluation of the candidate connections 214, the previous active connection 208 may (or may not be) selected to replace the new active connection 208.

One or more of the operations illustrated in FIG. 3 may be implemented as software instructions encoded on a computer-readable medium, in hardware programmed or designed to perform the operations, or both.

In some embodiments, the operations illustrated in FIG. 3 are performed by the first computing device 102. In other embodiments, one or more of the operations illustrated in FIG. 3 are performed by another computing device (e.g., as a web service) or peer-to-peer devices.

Figure 4:
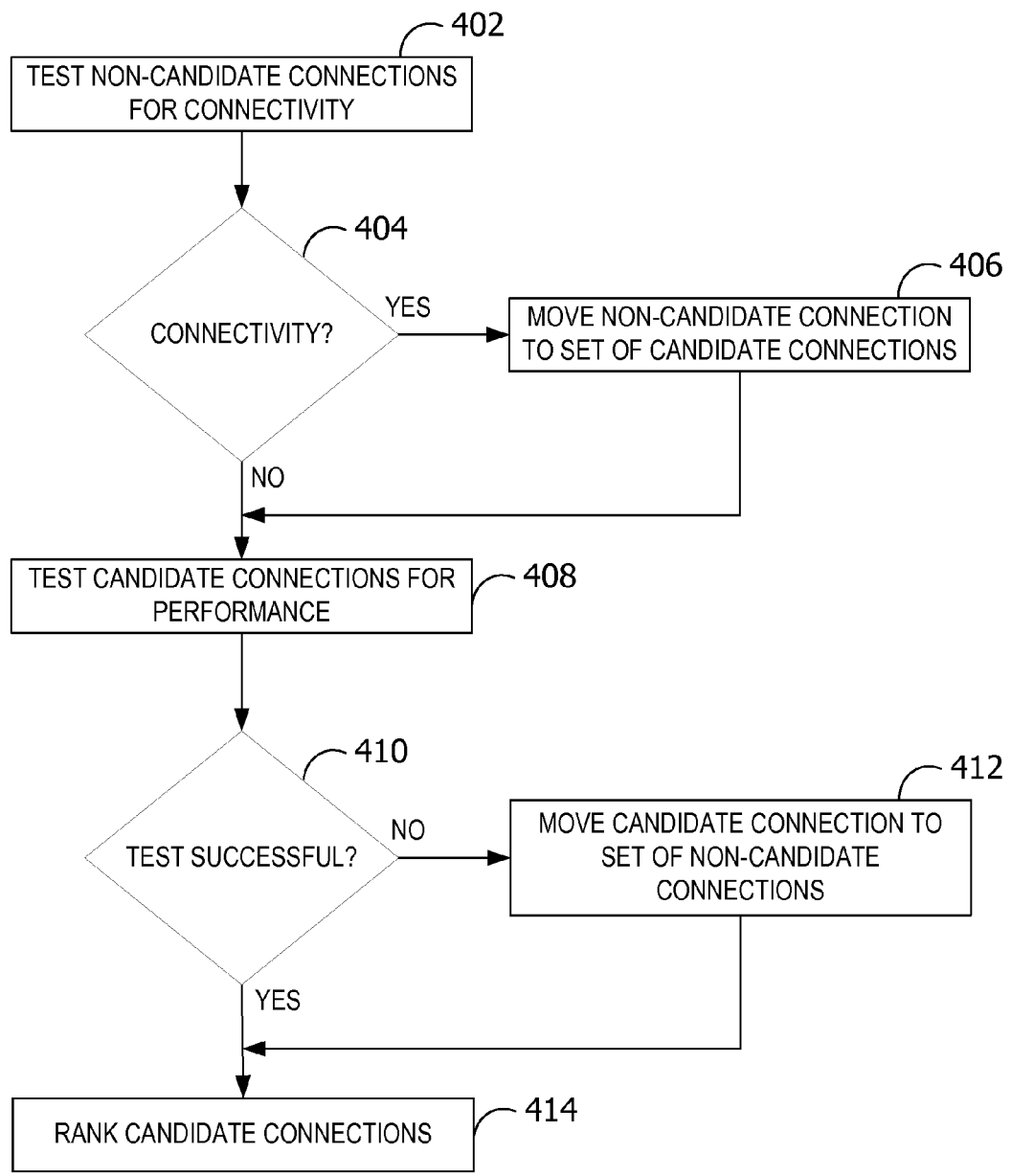
FIG. 4 is an exemplary flow chart illustrating the testing and ranking of connections.

Referring next to FIG. 4, an exemplary flow chart illustrates the testing and ranking of connections. The testing and ranking of the connections may occur at various intervals (e.g., hourly or daily) or in response to various conditions or events. For example, the operations may execute upon expiration of a countdown timer. Additionally, some of the operations may be performed in parallel rather than in sequence as illustrated. At 402, the non-candidate connections 216 are tested for connectivity (e.g., determine whether a connection can be established with the non-candidate connections 216) and/or performance (e.g., whether the performance of the non-candidate connections 216 are above a minimum threshold level). The testing includes, for example, attempting to establish a connection and exchange data (e.g., a test packet). The testing is used to determine whether to include any of the non-candidate connections 216 with the set of candidate connections 214. If the connectivity and/or communication performance between the first computing device 102 and another device (e.g., the second computing device 104) exists or is sufficient for a particular one of the non-candidate connections 216 at 404, the particular non-candidate connection 216 is moved to the set of candidate connections 214 at 406.

At 408, the set of candidate connections 214 are evaluated for connectivity and/or performance. The evaluation includes, for example, attempting to establish a connection and exchange data (e.g., a test packet). If the connectivity and/or performance test fails for any of the candidate connections 214, those failing candidate connections 214 are moved to the set of non-candidate connections 216 at 412. If the connectivity/performance test is successful at 410, the candidate connections 214 are ranked at 414.

The operations illustrated in FIG. 4 are performed periodically to maintain the set of candidate connections 214 and the set of non-candidate connections 216.

One or more of the operations illustrated in FIG. 4 may be implemented as software instructions encoded on a computer-readable medium, in hardware programmed or designed to perform the operations, or both.

In some embodiments, the operations illustrated in FIG. 4 are performed by the first computing device 102. In other embodiments, one or more of the operations illustrated in FIG. 4 are performed by another computing device (e.g., as a web service) or peer-to-peer devices.

Additional Examples

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for maintaining and selecting alternative connections for dynamic transition during communication between the first computing device 102 and the second computing device 104, and exemplary means for continuously evaluating the active connection 208 and searching for candidate connections 214 contemporaneously.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for maintaining alternative connections for dynamic transition during communication between a first computing device and a second computing device, said system comprising:

a memory area for storing data defining an active connection representing a currently in-use connection, a set of candidate connections representing a plurality of available connections not currently in use, and a set of non-candidate connections representing a plurality of connections that are currently unavailable for establishing communication between a mobile computing device and another computing device, said memory area being associated with the mobile computing device, wherein the data includes a protocol and address for the active connection and each of the candidate connections; and a processor programmed to:

establish communication between the mobile computing device and the other computing device via the protocol and address of the active connection, the mobile computing device and the another computing device being peer devices;

evaluate at least one of the non-candidate connections before establishing the communication with one of the candidate connections, the evaluation comprising updating the set of candidate connections to include the at least one of the non-candidate connections in the set of candidate connections based on the connectivity between the mobile computing device and the other computing device using the at least one of the non-candidate connections;

determine performance of at least one of the candidate connections, after both the communication has been established with the active connection and the evaluation of the at least one of the non-candidate connections, during transit of the mobile computing device and during communication with the other computing device using the active connection;

compare, by the mobile computing device, the determined performance with performance of the active connection;

select one of the candidate connections after evaluating the at least one of the non-candidate connections, based on the comparison, wherein the selection is performed without failure of the active connection; and transition communication between the mobile computing device and the other computing device, dynamically without input from a user, from the active connection to the selected candidate connection via the protocol and address of the selected candidate connection during transit of the mobile computing device.

2. The system of claim 1, wherein the processor is further programmed to move, after the evaluation of all the non-candidate connections, at least one of the candidate connections from the set of candidate connections to the set of non-candidate connections based on the determined performance of said at least one of the candidate connections.

3. The system of claim 1, wherein the processor is further programmed to move the active connection to the set of candidate connections.

4. The system of claim 1, wherein the processor is programmed to determine the performance by determining one or more of the following: latency, throughput, and packet loss.

5. The system of claim 1, wherein transit of the mobile computing device results in a topology change affecting communication between the mobile computing device and the other computing device.

6. The system of claim 1, further comprising means for maintaining and selecting alternative connections for dynamic transition during communication between the first computing device and the second computing device.

7. The system of claim 1, further comprising means for continuously evaluating the active connection and searching for candidate connections contemporaneously.

8. The system of claim 1, wherein the memory area further stores at least one previous active connection, the at least one previous active connection being included in the one or more candidate connections when performance of the at least previous active connection exceeds performance of the defined active connection, wherein during a subsequent evaluation of the one or more candidate connection, the at least one previous active connection is selected to replace the defined active connection.

9. A method comprising:
    defining, by a first computing device, a connection between the first computing device and a second computing device as an active connection;
    evaluating, as the first computing device changes location, a set of one or more candidate connections between the first computing device and the second computing device, the evaluation of the one or more candidate connections being performed after evaluating one or more non-candidate connections, wherein the evaluation of the one or more non-candidate connections comprises, for each of the one or more non-candidate connections, determining whether a connection can be established with the non-candidate connection and determining whether performance of the non-candidate connection is above a predefined threshold level, wherein the set of the one or more candidate connections is updated based on the evaluation of the one or more non-candidate connections; and
    transitioning, after updating the set of the one or more candidate connections with at least one of the one or more non-candidate connections, by the first computing device, the active connection from the defined connection to one of the candidate connections based on the evaluation of the one or more candidate connections and the evaluation of the one or more non-candidate connections.

10. The method of claim 9, wherein evaluating the one or more candidate connections comprises determining one or more of the following: bandwidth, latency, and error rate.

11. The method of claim 9, further comprising:
    generating, by the first computing device based on said evaluating, a score value for each of the evaluated candidate connections;
    generating a score value for the active connection; and
    comparing the score value for each of the evaluated candidate connections to the score value for the active connection, wherein transitioning the active connection comprises transitioning the active connection from the defined connection to one of the candidate connections based on said comparing.

12. The method of claim 9, further comprising detecting a failure of the active connection, and wherein transitioning the active connection comprises transitioning the active connection responsive to the detected failure.

13. The method of claim 9, wherein evaluating the one or more candidate connections comprises ranking the one or more candidate connections after testing connectivity and performance of the one or more candidate connections and the one or more non-candidate connections.

14. The method of claim 9, wherein evaluating the one or more candidate connections comprises evaluating the one or more candidate connections after a topology change in a network supporting the active connection.

15. One or more computer memories storing computer executable components, said components comprising:
    a communication component that when executed by at least one processor causes the at least one processor to define, by a first computing device, a connection between the first computing device and a second computing device as an active connection, the connection being defined by identifying, by the first computing device, available connections and selecting one of the available connections to establish communication;
    an analysis component that when executed by at least one processor causes the at least one processor to evaluate, as the first computing device changes location, a set of one or more candidate connections between the first computing device and the second computing device as alternatives to the active connection after evaluating performance of one or more non-candidate connections, wherein evaluating the performance of the one or more non-candidate connections comprises determining whether to update the set of the one or more candidate connections by including the one or more non-candidate connections in the set, wherein the communication component further executes to transition the active connection from the defined connection to one of the candidate connections based on the evaluation of the one or more candidate connections, wherein said evaluating the one or more non-candidate connections occurs, before transitioning the active connection from the connection to one of the candidate connections, during data transmission over the active connection between the first computing device and the second computing device; and
    a memory component that when executed by at least one processor causes the at least one processor to store the defined connection with the candidate connections and the one or more non-candidate connections, the one or more non-candidate connections representing connections that are currently unavailable due to performance.

16. The computer memories of claim 15, wherein the analysis component evaluates the candidate connections by determining one or more of the following for each of the candidate connections: bandwidth, latency, and error rate.

17. The computer memories of claim 15, wherein the first computing device and the second computing device are connected after registering with a shared service.

18. The computer memories of claim 15, wherein the analysis component evaluates the candidate connections at time-based intervals and/or after a topology change in a network connecting the first computing device and the second computing device.

19. The computer memories of claim 15, wherein the analysis component ranks the candidate connections after evaluating the one or more non-candidate connections and when the active connection is active.

20. The computer memories of claim 15, wherein the communication component transitions the active connection responsive to one or more of the following: a failure of a network component supporting the active connection, and a determination by the analysis component that said one of the candidate connections has a higher ranking than the active connection.

* * * * *